United States Patent [19]

Burress et al.

[11] Patent Number: 5,016,388
[45] Date of Patent: May 21, 1991

[54] PROTECTIVE TREE GUARD

[76] Inventors: J. David Burress; Deborah S. Burress, both of 15 Locustwood St., Las Vegas, Nev. 89110

[21] Appl. No.: 309,488

[22] Filed: Feb. 13, 1989

[51] Int. Cl.⁵ .............................................. A01G 13/10
[52] U.S. Cl. ............................................ 47/23; 47/21
[58] Field of Search ...................... 47/23, 24, 4, 21, 31; 52/170

[56] References Cited

U.S. PATENT DOCUMENTS

| | | | |
|---|---|---|---|
| 428,206 | 5/1890 | Fouquet | 47/23 |
| 1,074,828 | 10/1913 | Bigelow | 47/31 |
| 1,446,416 | 2/1923 | Curtiss | 47/21 |
| 2,197,929 | 4/1940 | Hale . | |
| 2,405,452 | 5/1945 | Savage . | |
| 2,749,964 | 6/1956 | Manning . | |
| 2,756,172 | 7/1956 | Kidd | 405/216 |
| 3,816,959 | 6/1974 | Nalle, Jr. . | |
| 4,395,844 | 8/1983 | Jopson . | |
| 4,764,054 | 8/1988 | Sutton | 405/216 |

FOREIGN PATENT DOCUMENTS 168367   1/1986   United Kingdom ................... 47/23

Primary Examiner—John E. Murtagh
Assistant Examiner—Michele A. Van Patten
Attorney, Agent, or Firm—Leon Gilden

[57] ABSTRACT

A protective tree guard is set forth formed of stretch polymeric filaments to define a webbing of finite length and width formed with a right and left webbing including cooperating snap fasteners to enable securement of the flexible netting about a desired tree. Upper and lower hollow sheaths slidingly receive drawstrings thereto to secure and position the tree guard in a predetermined orientation and position about the associated tree. Alternatively, a one-piece tubular webbing may be formed for securement about the aforenoted tree.

1 Claim, 1 Drawing Sheet

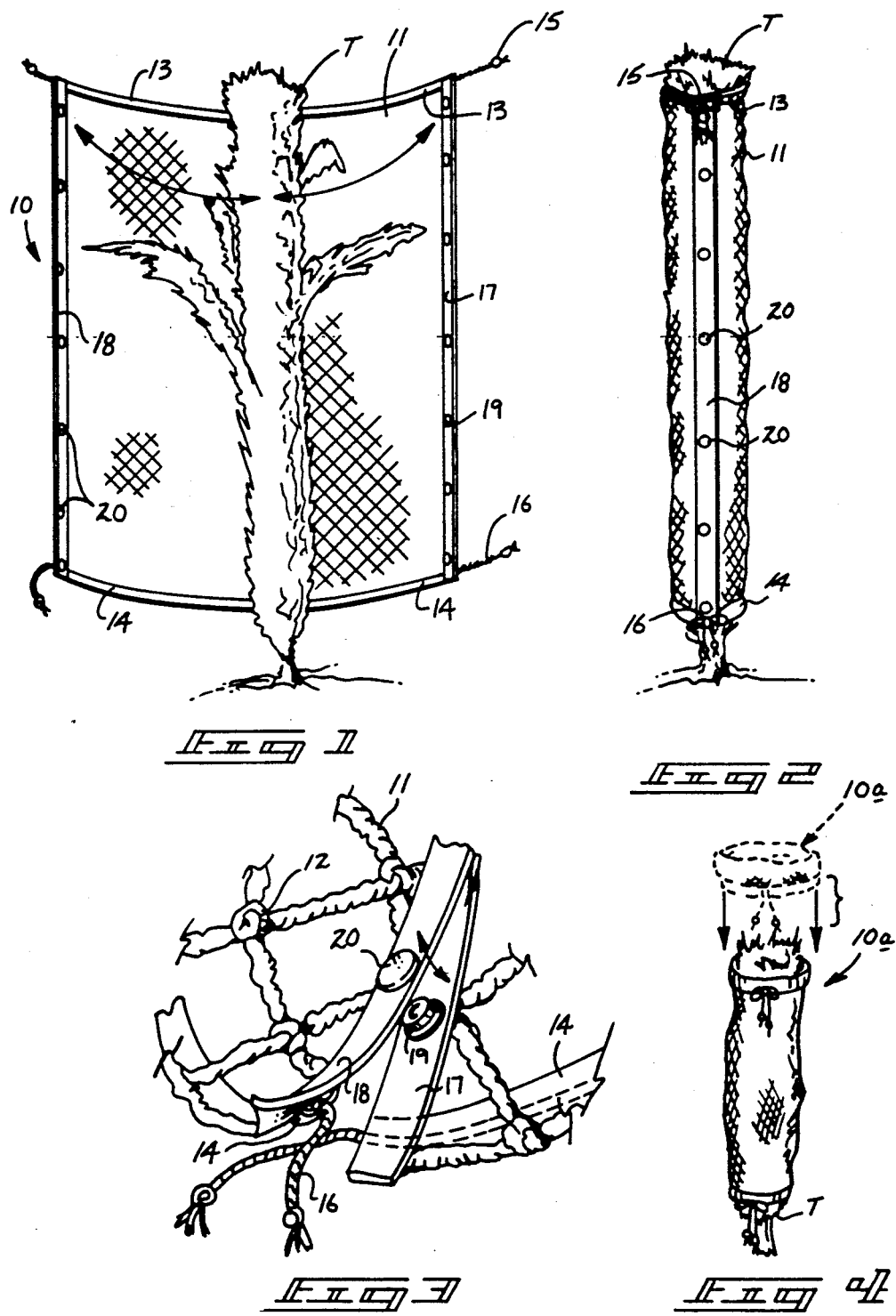

PROTECTIVE TREE GUARD

BACKGROUND OF THE INVENTION

1. Field of the Invention

The field of invention relates to protective tree guards, and more particularly pertains to a new and improved protective tree guard wherein the same is formed of flexible polymeric fibers to accommodate variously configured trees.

2. Description of the Prior Art

The use of tree guards is well known in the prior art. The securement of such tree guards about trees has heretofore been a labor intensive operation with mechanical complications in providing protective webbing about an associated tree. More particularly, the use of such webbing in association with the Italian cypress to enhance the appearance of the cypress and provide a more attractive appearance has heretofore not been available in the prior art.

For example, U.S. Pat. No. 2,197,929 to Hale sets forth a protective tree guard formed as an open mesh formed with a hook at a medial uppermost point of the webbing to provide a canopy-like configuration to be positioned over a tree. The Hale patent requires the use of a specifically dimensioned canopy for securement and positioning over a tree, as opposed to the instant invention accommodating trees of various dimensions and configurations.

U.S. Pat. No. 2,405,452 to Savage sets forth a canopy tree protector utilizing a plurality of skeleton ribs to provide a conical-type canopy for positioning over a tree. The Savage patent is of a relatively cumbersome and complex organization, as opposed to the instant invention.

U.S. Pat. No. 2,749,964 to Manning sets forth a method of providing a one-piece overlying canopy for positioning about a tree surface and projecting such a canopy from a gun-type dispenser. The Manning patent requires the use of extensive machinery to effect the formation and positioning of the polymeric-type webbing over a horticultural object and accordingly is of a relatively remote organization in protective tree coverings, as opposed to the instant invention which eliminates the need for accessory machinery and is of a relatively labor efficient organization to minimize effort in securement of the invention about an existing tree.

U.S. Pat. No. 3,816,959 to Nalle sets forth a tubular plastic guard for protecting young trees, plants, and the like with an associated stake for surrounding the plant to be protected while the stake portion secures the tubular mesh in a desired orientation relative to the plant to be protected.

U.S. Pat. No. 4,395,844 to Jopson sets forth a one-piece webbing formed of stretch-type material for securement and positioning about a plant, but fails to provide the securement fastener mechanism of the instant invention to provide an efficient and labor saving manner of positioning the instant invention about mature trees, as opposed to the Jopson patent.

As such, it may be appreciated that there is a continuing need for a new and improved protective tree guard wherein the same addresses both the problems of effectiveness and ease of use, and in this respect, the present invention substantially fulfills this need.

SUMMARY OF THE INVENTION

In view of the foregoing disadvantages inherent in the known types of protective tree guards now present in the prior art, the present invention provides a protective tree guard wherein the same may be compactly stored when not in use and be further easily and efficiently secured about an existing tree during periods of use. As such, the general purpose of the present invention, which will be described subsequently in greater detail, is to provide a new and improved protective tree guard which has all the advantages of the prior art protective tree guards and none of the disadvantages.

To attain this, the present invention comprises a protective tree guard formed of stretch-type polymeric material to provide a netting formed with knotted or thermoformed intersections to maintain the integrity of the netting and further is provided with right and left perimeter webbing having secured therethrough coacting snap fasteners to secure the side perimeters of the netting about an associated tree. Further, upper and lower perimeter strands of the netting has secured thereto an adjacent tubular sheath wherein a drawstring is slidingly positioned through the sheath for securement of upper and lower terminal perimeter ends of the netting to position the netting at a predetermined orientation relative to the tree.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved protective tree guard which has all the advantages of the prior art protective tree guards and none of the disadvantages.

It is another object of the present invention to provide a new and improved protective tree guard which may be easily and efficiently manufactured and marketed.

It is a further object of the present invention to provide a new and improved protective tree guard which is of a durable and reliable construction.

An even further object of the present invention is to provide a new and improved protective tree guard which is susceptible of a low cost of manufacture with regard to both materials and labor, and which accordingly is then susceptible of low prices of sale to the consuming public, thereby making such protective tree guard economically available to the buying public.

Still yet another object of the present invention is to provide a new and improved protective tree guard which provides in the apparatuses and methods of the prior art some of the advantages thereof while simultaneously overcoming some of the disadvantages normally associated therewith.

Still another object of the present invention is to provide a new and improved protective tree guard wherein the same may be compactly stored when not in use and readily secured by fastening of perimeter sides of the guard together and subsequent tightening of upper and lower drawstrings about an associated tree.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention positioned about a tree prior to securement.

FIG. 2 is an isometric illustration of the instant invention illustrating the securement of the protective tree guard about an associated tree.

FIG. 3 is an isometric illustration, somewhat expanded, of the netting of the instant invention.

FIG. 4 is an isometric illustration of an alternative form of the invention formed as a continuous tubular netting.

DESCRIPTION OF THE PREFERRED EMBODIMENT

With reference now to the drawings, and in particular to FIGS. 1 to 4 thereof, a new and improved protective tree guard embodying the principles and concepts of the present invention and generally designated by the reference numeral 10 will be described.

More specifically, it will be noted that the protective tree guard 10 essentially comprises an interwoven fabric or polymeric net 11 formed with knotted or thermoformed intersections 12 to maintain the integrity of the netting. The netting is formed typically of stretch-type filaments of polypropylene or polypropylene-polyethylene compositions to effect the stretchable netting required by the the instant invention to accommodate trees of various configurations. Secured integrally to the upper perimeter net strand 11a and the lower perimeter net strand 11b respectively is an upper hollow tubular sheath 13 and a lower hollow tubular sheath 14 continuously formed to and coextensive with the aforenoted net strands. Contained within the sheaths are respective upper and lower drawstrings 15 and 16 to tighten the tree guard once secured about an associated tree "T". Formed continuously and coextensively with the right and left perimeters of the interwoven net 11 is a right perimeter webbing 17 and a left perimeter webbing 18 formed desirably of a transparent polymeric and having formed therethrough respective transparent male snap fasteners 19 and transparent female snap fasteners 20. Desirably, the interwoven net 11 is dyed green and in association with the transparent webbing and fasteners, provides an unobtrusive aesthetically pleasing organization to enhance its use and positioning about an associated tree.

The protective tree guard 10 is merely positioned about a tree "T" and stretched and secured about the tree, as illustrated in FIG. 2, and assembled with subsequent tying of the upper and lower drawstrings 15 and 16 to secure the tree guard in a predetermined vertical orientation relative to the tree "T". It should also be understood that the tubular sheaths 13 and 14 are also formed of a stretch-type material to accommodate variously configured tree organizations.

Alternatively, the tree guard may be formed in a one-piece continuous net 10a, as illustrated in FIG. 4, wherein the net is merely compressed and drawn down about the associated tree "T" and thereupon unrolled upwardly to secure the tree and its associated limbs and provide a compact securement of the tree.

As to the manner of usage and operation of the instant invention therefore the same should be apparent from the above disclosure and accordingly, no further discussion relative to the manner of usage and operation of the instant shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A protective tree guard for securement about mature trees, comprising,
    a finite flexible net including an upper perimeter, a lower perimeter, a right perimeter, and left perimeter, and
    securement means for joining said right perimeter and said left perimeter together, and
    auxiliary securement means for selective tightening of said upper perimeter and said lower perimeter about said tree when said right perimeter and said left perimeter are joined together, and
    wherein said finite flexible net includes a matrix of intersecting polypropylene fabric lines including knotted intersections at the intersecting of the lines for maintaining a geometric integrity of the net, and wherein said flexible net includes an upper hollow tubular sheath integrally secured to an upper perimeter net strand, and a lower hollow tubular sheath integrally secured to a lower perimeter net strand wherein said upper and lower perimeter strands respectively define said upper and lower perimeters, and wherein each of said upper and lower hollow tubular sheaths include slidingly therethrough a drawstring of finite length extending exteriorly through each tubular sheath, and wherein the upper and lower drawstrings and the upper and lower hollow tubular sheaths define said auxiliary securement means, and wherein said securement means includes a right perimeter webbing and a left perimeter webbing to respectively define said right and left perimeter, and wherein said right perimeter webbing includes a series of first snap fasteners, and wherein said left perimeter webbing includes a plurality of second snap fasteners wherein said right and left snap fasteners are equally spaced along said right and left perimeter webbing to enable securement of said left perimeter webbing in an overlying relationship to said right perimeter webbing, and wherein said right and left perimeter webbing are coextensive with said right and left perimeter.

* * * * *